March 8, 1938.
A. E. SEELIG
Re. 20,668
MULTISTAGE FAN
Original Filed April 26, 1935 2 Sheets-Sheet 1
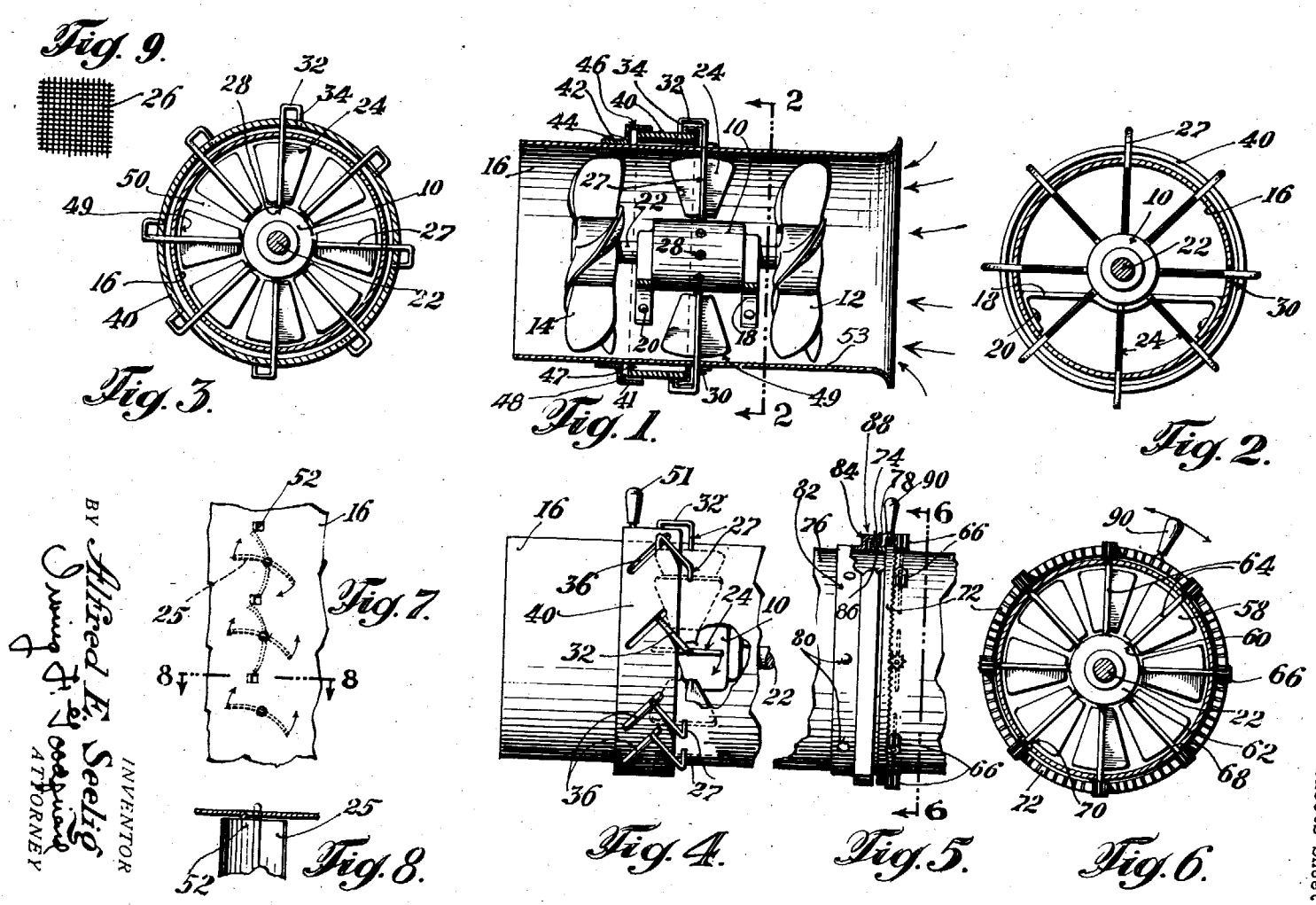
INVENTOR
BY Alfred E. Seelig
Irving F. Goodman
ATTORNEY March 8, 1938. A. E. SEELIG Re. 20,668

MULTISTAGE FAN

Original Filed April 26, 1935 2 Sheets-Sheet 2

INVENTOR
Alfred E. Seelig
BY Irving F. Goodfriend
ATTORNEY

Reissued Mar. 8, 1938

Re. 20,668

UNITED STATES PATENT OFFICE 20,668

MULTISTAGE FAN

Alfred E. Seelig, New York, N. Y.

Original No. 2,037,395, dated April 14, 1936, Serial No. 18,326, April 26, 1935. Application for reissue April 20, 1937, Serial No. 138,521

22 Claims. (Cl. 230—114)

This invention relates to propeller fans and particularly to a load limiting air delivery pressure volume regulating means and combined following stage air guide vane to effectively multi-stage propeller fans.

Propeller fans are used in the art for varied purposes, as for example to supply air for fuel combustion in furnaces, for drying, for air conditioning and for ventilation or for other uses where high volumes of air at relatively low static pressures are desired.

The volume of air and the pressure at which it is delivered are proportional, among other things, to the diameter of the fan and the rate at which it revolves. It will be apparent that for increased air delivery volumes and increased air delivery pressures, it is necessary to increase either the speed of rotation of the fan or its diameter, or both. It is apparent that, from a standpoint of mechanical design and the reduction of attendant noise of operation, it is not desirable to increase the diameter of the fan and its rotational speed beyond certain limits.

In order, therefore, to increase the delivery volume and pressures of such fans while at the same time limiting the speed and diameter thereof, I arrange a plurality of fans on a common drive shaft in series in a common conduit to thereby provide a multi-stage fan, having two or more stage fans, each succeeding fan to act as a booster for the preceding fan.

In a propeller fan, the blades of which are of helicoidal design, the resultant motion imparted to each particle of air while generally forward is also rotational and is in the nature of a forward moving spiral.

It will be apparent, therefore, that in multi-stage fans, since each subsequent or following stage fan operates at the same speed and in the same rotative direction as the preceding stage fan, the column of air leaving the preceding stage fan will have imparted to it a rotary motion having substantially the same rotary speed and rotary direction as that of the following stage fan.

It will, at once, be seen that the following stage fan can react only slightly or perform very little work on the air delivered to it, and to whip or push it forward, since both the fan and air are rotating in a similar rotative direction at substantially the same speed. It is readily apparent, therefore, that multi-staging the fans will not, of itself, result in the delivery of increased air volumes and pressures, since it becomes necessary to so present the air delivered by the preceding fan to the following stage fan, that the following stage will thereby react and perform work on the air and to thereby increase its forward velocity and thereby the volume and pressure at which it is finally delivered from the multi-stage fan.

The present invention, therefore, contemplates the provision of means whereby propeller fans may be effectively multi-staged.

I have found that by changing the motion of the air as it is delivered by the preceding fan from a forward rotational direction to a forward direction parallel to the axis of the leading fan, without substantially reducing the speed of air flow, the leading fan may then effectively react and perform work on the air so delivered to it, whereby the air volume and pressures delivered by such a multi-stage fan are substantially increased by each additional stage which is provided.

It will readily be understood that the magnitude of such forward rotational motion of the air delivered from a preceding fan may be varied, thereby varying the effectiveness of the following fan upon the air delivered to it and consequently varying the air volume and pressure delivered by the multi-stage fan as a unit.

A novel and simple pressure volume regulator for multi-stage fans may accordingly be arranged by providing means for varying the magnitude of the rotational motion of the air directed to the following stage fan, the provision of which the present invention further contemplates.

The volume of air and the pressure delivered by propeller type fans may be varied by either changing the speed of rotation of the fan, by the use of a variable speed motor, or by maintaining a constant speed of rotation of the fan and restricting the air flow from the fan by means of a damper.

Constant speed motors are simpler in construction, more dependable in operation and less costly than variable speed motors, operating at high speeds, especially for use with alternating current, and the present invention is particularly directed to the regulation of multi-stage propeller fans driven by constant speed electric motors.

Since constant speed motors are mechanically more desirable to drive propeller fans, and therefore most frequently used in the art, regulation of the air volume and pressure by means of dampers inserted in the air conduits, which increase the resistance to the air flow on the fan delivery side to thereby decrease the air volume delivered, are most usually encountered in practice.

Such damper controlled constant speed propeller fans generally heretofore found in the art, place an increased horsepower load on the driving motor as the delivery volume is decreased, since the increase in pressure on the delivery side of the fan, caused by the damper restriction, produces an increased resistance to the rotation of the fan. The horsepower required to drive the fan increases as the volume of air is decreased under the influence of the damper, until the damper is entirely closed and air delivery ceases, when the horsepower load on the driving motor is at a maximum.

It is apparent, therefore, that damper regulation of air supplied by constant speed motor driven propeller fans, heretofore generally found in the art, requires comparatively large capacity motors due to the fact that closing of the damper would overload the motor capacity selected to meet the requirement of maximum air delivery with wide open damper.

The present invention, therefore, further contemplates the provision of air volume regulating means for combination with constant speed motor driven multi-stage propeller fans, which, within the predetermined air volume operating limits of the fans, provides a decreasing horsepower characteristic with decreasing volumes of air flow delivered and which regulating means are arranged to limit the minimum air volume delivered and therefore the maximum horsepower load which can be placed on the driving motor.

The various objects of my invention will be clear from the description which follows and from the drawings in which Fig. 1 is a side elevation and partial section of my new multi-stage fan, showing the combined guide and pressure volume regulating vanes.

Fig. 2 is a sectional view of the same taken on the line 2—2 of Fig. 1.

Fig. 3 is front sectional elevation, showing the guide vanes in fully closed position.

Fig. 4 is a partial side elevation of my new multi-stage fan, and guide vane regulating means.

Fig. 5 is a partial side elevation of a modification of my invention.

Fig. 6 is a section taken on the line 6—6 of Fig. 5.

Fig. 7 is a partial plan view of a further modification of invention.

Fig. 8 is a section on the line 8—8 of Fig. 7.

Fig. 9 is a front elevation of a modification of my novel guide vanes.

Figure 10:
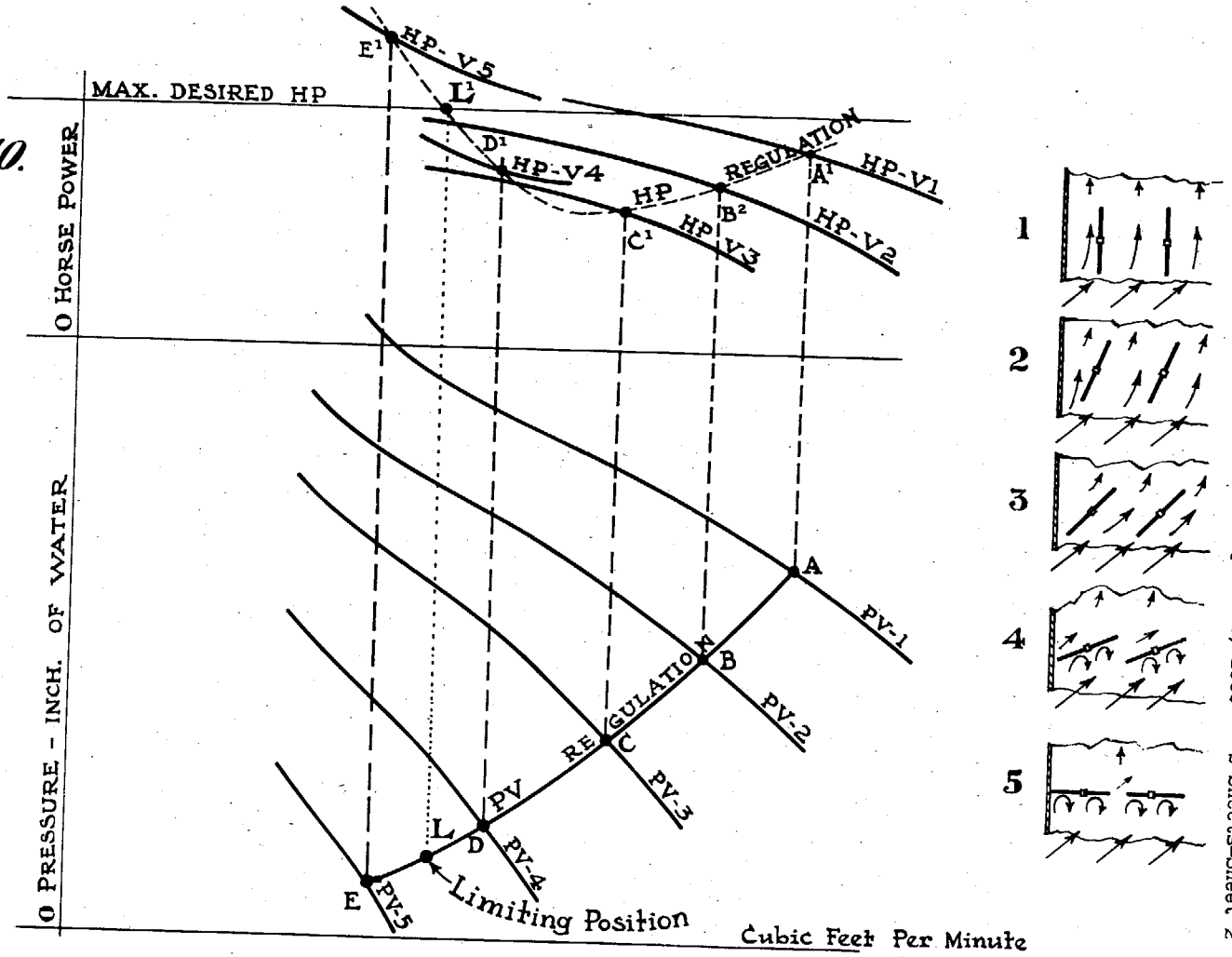
Fig. 10 is a graph of the pressure, volume and horsepower characteristics of a multi-stage fan constructed in accordance with my invention.

In that practical embodiment of my invention which I have illustrated by way of example in Figs. 1 to 4 inclusive, a constant speed electric motor 10, for driving the propeller fans 12 and 14, is supported in the fan casing 16 on the motor cradle 18, which is secured to the casing in any suitable manner, as for example by means of bolts 20.

The motor shaft 22 extends from both sides of the motor body to receive the propeller fans, as by a key and key way, well known in the art and which therefore need not be described in detail.

It will be understood that the motor need not be positioned intermediate the fans, but may be positioned in any convenient place to drive the fans, as for example, outside the casing and operatively connected to the fans, either directly or indirectly, as by means of suitable gears or belts and pulleys.

As the motor drives the fans, air is drawn into the casing by the motion of the first fan 12, which whips and pushes the air before it imparting thereto a generally forward spiral motion, having substantially the same rotary direction as the fan 14. Since the following stage fan 14 is similar to the first stage fan 12 and operates at the same speed, it will be apparent that the following stage fan does not effectively react or perform work on the air delivered to it and does not substantially impart any further motion thereto, since both the following fan and the air delivered to it rotate substantially in the same direction and at the same speed.

In order therefore, to change the motion of the air, as it flows from the first stage fan from generally forward spiral direction and to axially direct it toward the following stage fan, I arrange guide or redirectional vanes 24, radially in the casing, adjacent to and on the discharge or delivery side of the first stage fan. The air, as it is delivered by the first stage fan, has imparted to it a substantially forward rotary motion with which it strikes the guide vanes, and flows therealong and is directed thereby axially toward the following stage fan, which can then more effectively react and perform work on the air stream directed to it.

Such guide or redirectional vanes may be constructed from sheet metal in the form of flat plates as shown in Fig. 1.

In order to prevent air eddy currents, which may be produced by the flow of air against a flat plate, or any possible resulting friction loss, streamlined guide vanes 25, shown in Fig. 7, provided with proper curvature, whereby the direction of the air flowing along the guide vanes may be gradually changed without formation of eddy currents or attendant friction loss may be supplied.

If desired, such guide vanes may take the form of interlaced flat plates or wires 26, as a honeycomb or egg crate, shown in Fig. 9 or various other shapes.

The fans may be arranged on the motor shaft as close together as the size of their common motor drive will permit, the guide vanes, preferably being arranged as nearly adjacent to the first stage fan as is possible.

It will be apparent that the delivery effectiveness of the following fan on the air delivered to it is dependent on the magnitude of the rotational motion component of the air directed to the said following fan. It will be seen, therefore, that the air volume and pressure generated by the following stage fan, may be varied by varying the magnitude of the rotational motion of the air, prior to its delivery to the following stage fan.

As such rotational air component is increased, the effectiveness of the following fan will decrease and the air delivery volume and pressure delivered by the multi-stage fan will therefore decrease.

It will at once be apparent that the magnitude of the rotational component may be increased by changing the position of the guide vane relatively to the following stage fan, whereby only a lower proportion of the air is changed from the rotational direction as it leaves the first fan.

In order, therefore, to provide a means for varying the proportion of the air delivered to the following fan with a rotary speed component substantially equal to and in a rotary direction similar to that of the following fan and thereby decreasing the air delivery of my multi-stage fan as a unit from the maximum to any desired lower magnitude, I pivotally arrange the guide vanes in the casing so that their position relatively to the following stage fan may be changed to thereby vary the rotary component of the air directed to it.

Inasmuch as the following fan is less effective on the air directed to it and the work done by it on the air is less, as the rotary air delivery component is increased, it will be readily seen, that the motor horsepower required to drive the fans will decrease as the volume is decreased and not increase as heretofore with constant speed damper controlled fans.

In order to vary the position of the guide vanes and to thereby regulate the air volume and pressure delivered by the multi-stage fan, I secure each guide vane to a shaft 27 which is pivotally arranged in a socket 28 arranged on the motor body, and thereby adapted to swing or rotate in the casing in the sockets.

The vane shafts extend through suitable openings 30, arranged in the casing, and are provided at their upper ends with the horizontal arms 32, each having a pin 34 depending therefrom and engaging a slot 36, arranged on a sleeve 40, which is adapted to be rotated on the casing thereabout.

In order to rotatably secure the sleeve on the casing, I prefer to arrange thereon a plurality of opposed pairs of Z bars 41, the lower horizontal sides 42 of which are secured to the casing in any suitable manner, such as by rivets 44, and the upper horizontal sides 46 of the opposed Z bars together form an annular channel 47 in which the sleeve may be moved on the casing, the vertical sides 48, restraining the motion of the sleeve to rotation about the casing.

A plurality of similar slots 36 are circumferentially arranged parallel to each other on the sleeve and divergently disposed to the axis thereof, each slot operatively engaging the pin depending from the horizontal vane arm and in which slot the pin may be urged to reciprocate.

As the sleeve is rotated on the casing by the handle bar 51, extending upwardly from the sleeve, the pin is urged to move in the slot, causing the shaft to rotate in the socket, and thereby changing the position of the vane relative to the first fan, or any following fan.

The slots are arranged to rotate the vanes from a full open position, when the vanes are disposed at right angles to the first fan, as shown in Fig. 2, in which position, air flowing from the first fan is directed by the vanes toward the following fan axially thereof and the rotary motion imparted to the air by the first fan, is completely eliminated and the multi-stage fan delivers its maximum capacity, to the full closed position when the vanes are disposed parallel to the first fan, as shown in Fig. 3, in which position the multi-stage fan delivers its minimum capacity.

The vanes are preferably arranged to extend completely from the motor body to the inner face 53 of the casing, the upper edges 49, of the vanes, being preferably provided with a curvature similar to that of the casing, whereby the upper vane edges will be contiguous to the casing, when the vanes are disposed in the full closed position.

In Fig. 10, I have shown a graph which shows the pressure, volume and horsepower characteristics of a two stage fan constructed in accordance with the present invention.

One series of curves is drawn to show the air volume in cubic feet per minute and the corresponding pressures delivered by the two stage fan for certain predetermined guide vane positions, which positions are diagrammatically illustrated at the right of the curves.

The pressure volume characteristic curves are indicated by the letters PV, the numeral adjacent the letters signifying the corresponding position of the guide vanes as illustrated at the right of the curves.

The second series of curves are drawn to show the horsepower required to deliver the volume of air at the pressure shown on the first series of curves corresponding thereto for the given vane positions. These curves are indicated by the letters HP—V, the numeral adjacent the letters signifying the corresponding position of the guide vanes.

When the guide vanes are turned to the full open, indicated as position 1, the pressure volume fan characteristics are shown by the curve, PV1 and the corresponding horsepower characteristics by the curve HP—V1.

As the guide vanes are rotated in the casing to assume an arbitrary position 2, it will be seen that the air straightening action of the guide vanes is reduced and they no not completely eliminate the rotary motion of the air, thereby making the second stage fan less effective and a lower pressure volume characteristic (PV2) will be obtained with a correspondingly lower horsepower characteristic (HPV2).

As the guide vanes are rotated into the position 3, the magnitude of the rotary component of the air directed to the following fan is increased and the corresponding pressure volume (PV3) and horsepower (HPV) characteristics are of a still lower magnitude.

As the guide vanes are still further rotated, toward full closed position, into arbitrary position 4, the magnitude of the rotary air component is further increased, and in addition the guide vanes now restrict the air passage in the manner of a damper, thereby adding resistance to the flow of the air and producing an increasing resistance to the rotation of the fans and a proportional increase in the power required to drive the fans.

Therefore, a position will be reached, where for a lower pressure volume (PV4) characteristic, the corresponding horsepower characteristic (HP—V4) will be higher and, will rapidly increase, in value and when the guide vanes assume a completely closed position as indicated at 5, the horsepower (HPV5) will be greater than the maximum desired horsepower capacity, which would thereby overload the driving motor.

Hence, the present invention further contemplates the provision of means for limiting the maximum load which may be placed on the motor driving my multi-stage fan, as the air volume is reduced.

For the purpose of illustration, I will further describe my novel multi-stage fan and volume regulating means as applied to a coal burning boiler for supplying air thereto, though other applications, where either forced or induced draft are desired, as for example fans supplied for ventilating purposes, will be readily apparent to those skilled in the art.

The thickness of the fuel bed, for which combustion air is to be furnished by my multi-stage fan, a sudden requirement for quick steaming in the boiler, or other conditions may require the supply by the fan of the volume of air at the pressure indicated at A on the curve PV1, which is obtained with the guide vanes disposed in full open position, the horsepower requirement for which will be found at A′ on the curve HP—V2. As the steam in the boiler is raised to the desired pressure, it will be apparent that the rate of fuel combustion must be lowered to a combustion rate which will maintain the boiler load, and the steam at the desired pressure, and therefore a lower air delivery volume is required. This may correspond to the pressure volume characteristic B, to obtain which, it is readily seen requires the guide vanes to assume position 2 at which position the horsepower required is indicated at B′.

By further closing the guide vanes, it is readily seen that a power pressure and volume C, with a corresponding lower horsepower C′ is obtained, until the dampering effect of the guide vanes is encountered, when the horsepower commences to increase, as indicated at D′.

It will be readily seen that as the dampering effect of the guide vanes increases air volumes and pressures are reached at which the horsepower increases until it exceeds the maximum desired horsepower, namely the motor capacity.

It then becomes necessary to limit the reduction in the quantity of air delivered so that the motor will not be overloaded. The present invention therefore further contemplates the combination with the rotatable guide vanes of means for limiting the magnitude of the minimum air volume delivered and thereby limiting the load which may be applied to the motor drive.

When the air passage is completely closed by the guide vanes, neither fan can deliver any air and the horsepower load on the driving motor will be at a maximum, and it will be understood that this maximum load may be avoided by arranging the guide vanes in such fashion that the entire air passage is never completely closed or restricted.

I accomplish such load limitation by constructing the guide vanes of a size such that, as the vanes are rotated into the full closed position, shown in Fig. 3, they are appreciably spaced from each other, to provide the air release passages 50. The proportional total area of these air release passages to the total area of the guide vanes may be varied as desired, but should be arranged to limit the pressure volume delivered when the guide vanes are completely closed to the magnitudes set forth at L on the PV regulation curve, thereby limiting the load on the motor to the maximum desired horsepower.

The closure of the air passage may likewise be restricted by providing a stop pin 52 on the inner wall 54 of the casing, thereby limiting the rotation of the guide vanes and preventing the casing area, or air passage, from being completely closed. The position of the stop pin will be determined from the pressure volume and horsepower characteristics of the particular fans to which the guide vanes are applied, as described above.

It will be seen that my novel adjustable guide vanes redirect the air from the first stage fan toward any following stage to thereby effectively multi-stage a plurality of fans and provide a means for effectively regulating the volume of air delivered by a multi-stage fan unit without overloading the motor driving the fans, by varying the magnitude of the rotational component of the air entering a following stage fan.

It will of course, be understood that the fan 12 may be omitted to thereby provide a simple or single stage fan having adjustable guide vanes, such as shown in Figure 7, arranged adjacent the inlet side thereof, the surfaces of which vanes give to the air entering the fan a rotational and tangential component the magnitude of which may be varied by changing the position of the guide vanes relative to the fan to thereby provide a novel volume pressure regulating means for a simple or single stage fan which will not overload the motor driving such fan as the volume of air delivered is decreased.

Referring now to Figures 5 and 6, I have shown therein, a modification of the means for actuating my combined guide vane and pressure volume regulating means.

In order to rotate the guide vanes 58, about the sockets 60 arranged on the motor body 62, I provide the radial shafts 64, fastened to the guide vanes, with the pinions 66 which are secured to the shaft ends 68, extending above the casing, through suitable openings 70 arranged thereon.

The pinions operatively engage the annular rack gear 72, arranged on one face of the sleeve 74, which is slidably arranged on the casing 76, and which is provided on the opposed face with the ring 78. Fixedly secured to the casing, by the rivets 80, I arrange the coupling 62, which is provided with the annular flange 84, having the sleeve ring retaining wall 86 depending therefrom to provide an annular channel 88 in which the sleeve ring is slidable.

As the sleeve is rotated on the casing by means of the handle bar 90, extending therefrom, the gear rack and pinions coact to rotate the guide vanes into any desired position, and to thereby regulate the air volume and pressure delivered by the fans in the manner heretofore described.

It will be understood, that a friction drive, belt and pulley, or any other suitable arrangement may likewise be used for my novel fan air pressure and volume regulator.

It will be seen that I have provided a novel means for effectively multi-staging propeller fans, and which means are adapted to provide pressure volume air regulation of said fans without overloading the motor driving the fans.

It will be further seen that I have also provided means for regulating the volume and pressure of the air delivered by a simple or single stage fan, which regulating means will not overload the motor driving the fan as the air volume delivered is decreased.

While I have shown and described certain specific embodiments of my invention, it will be understood that I do not intend to limit myself thereto but desire to claim my invention as broadly as may be permitted by the state of the prior art and the scope of the appended claims.

I claim:

1. The combination with a casing of a plurality of fans for generating a stream of air arranged in the casing, means for driving the fans, the said stream of air having imparted thereto a generally forward rotational motion in the nature of a forward moving spiral by one of the said fans, and means intermediate the fans adjustable about an axis angularly disposed to the fan shaft for selectively varying the rotational motion of the air stream generated by one of the said fans whereby air at predetermined volumes is delivered by the fans and the power required to drive the fans decreases with decreased volumes of air delivered by the fans.

2. In combination, a motor, a multi-stage fan, air stream pressure volume regulating means for said multi-stage fan, said fan driven by said motor and said regulating means comprising a plurality of guide vanes adjustable about an axis disposed angularly to the fan shaft and arranged intermediate the fan stages, whereby the motor power required to drive the fans is directly proportional to the volume of air delivered.

3. In combination, a motor, a multi-stage fan comprising a plurality of blade units, air stream pressure volume regulating means for said multi-stage fan, said blade units rotating in the same direction at constant speed and driven by said motor, and said regulating means comprising a plurality of guide vanes adjustable about an axis disposed angularly to the fan shaft and arranged intermediate the blade units, whereby the power required to drive the motor and fan decreases as the volume of air delivered by the fan is thereby decreased and means for limiting the adjustment of the said guide vanes.

4. In a device of the character described, a casing, a plurality of fans arranged in the casing, means for driving the fans, air volume regulating means comprising a plurality of guide vanes rotatable about an axis disposed angularly to the fan shafts and secured to the casing intermediate the fans and gear means for rotating the guide vanes into selected positions whereby air at predetermined volumes corresponding to the position of the vanes is delivered by the fans.

5. In a multi-stage fan, the combination with a plurality of fans, of means for driving the fans, a guide vane rotatable about an axis disposed angularly to the fan shafts and arranged intermediate the fans and means for selectively positioning the guide vane relatively to the fans whereby air at predetermined volumes corresponding to the position of the guide vane selected is delivered by the fan and the power requirements of the fan driving means is an increasing function of the volume of air delivered by the fans.

6. In a multi-stage fan, the combination with a plurality of fans for delivering air, one of the said fans imparting to the air delivered by it a rotational forward motion, of means for driving the fans and means adjustable about an axis disposed angularly to the fan shafts and adjacent said fan for variably adjusting the rotational component of the imparted air motion, before the air is delivered to the other fan, whereby the volume of air delivered by the multi-stage fan may be adjusted, said multi-stage fan having a decreasing horsepower characteristic with decreasing volumes of air delivered by the fan.

7. In a device of the character described, a casing, a plurality of fans arranged in the casing and rotating in the same direction, means for driving the fans, a plurality of guide vanes operatively arranged in the casing intermediate the fans and adapted to be selectively positioned therein about an axis disposed at an angle to the fan shafts and to thereby variably restrict the casing area, and means for operating the vanes, whereby the volume of air delivered may be adjusted selectively and the power requirements of the fan driving means being thereby of an increasing function of the air delivered by the fans, said vanes arranged to limit the maximum restriction of the casing area.

8. A device of the character described comprising a casing, a plurality of fans arranged in the casing, a motor operatively connected to the fans and means for regulating the volume of air delivered by the fans including guide vanes adjustable about an axis disposed at an angle to the fan shafts and arranged intermediate the fans and adapted to be positioned relatively to the fans whereby the motor horsepower required to drive the fans decreases as the volume of air delivered by the fans is lowered by the selective positioning of the guide vanes.

9. The combination with a casing of a plurality of propeller fans driven at constant speed arranged in the casing, means operatively connected to the fans for driving the fans and means for regulating the volume of air delivered by the fans, said volume regulating means being arranged intermediate the fans and adapted to be selectively positioned relatively thereto to thereby selectively regulate the volume of air delivered by the fans whereby the fan driving means horsepower decreases as the volume of air delivered by the fans is selectively decreased.

10. The combination with a casing of a plurality of propeller fans arranged in the casing, means operatively connected to the fans for driving the fans, means for regulating within a selected range the volume of air delivered by the fans, said volume regulating means being arranged intermediate the fans and adapted to be selectively positioned relatively thereto to thereby selectively regulate the volume of air delivered by the fans whereby the fan driving means horsepower decreases as the volume of air delivered by the fans is selectively decreased.

11. The combination set forth in claim 10 and including means for limiting the position of the volume regulating means.

12. The combination with a plurality of propeller fans driven at constant speed of guide vanes adjustably arranged intermediate the fans, said vanes adapted to be selectively positioned relatively to the fans, to thereby provide means for regulating the volume of air delivered by the fans whereby the motor horsepower required to drive the fans decreases as the volume of air delivered by the fans is lowered by the adjustment of the guide vanes, any selected position of the guide vanes corresponding to a predetermined air volume fan delivery.

13. In a device of the character described, a casing, a plurality of fans arranged in the casing, a plurality of guide vanes swingably secured in the casing intermediate the fans, a sleeve rotatably arranged on the casing and provided with a plurality of slots and an arm secured to the guide vanes and engaging the slots, whereby the guide vanes are swung in the casing upon rotation of the sleeve on the casing.

14. In a device of the character described, a casing, a plurality of fans arranged in the casing, a plurality of guide vanes swingably secured to the casing intermediate the fans, a sleeve rotatably arranged on the casing, and means operatively connecting the sleeve and the guide vanes whereby the guide vanes are swung in the casing on rotation of the sleeve on the casing.

15. In a device of the character described, a casing, a plurality of fans arranged in the casing, a plurality of guide vanes adjustably arranged in the casing intermediate the fans, a sleeve rotatably arranged on the casing and a linkage arrangement connecting the sleeve and the guide vanes whereby the guide vanes are adjusted in the casing on rotation of the sleeve on the casing.

16. In combination, a casing, a constant speed propeller fan arranged in said casing and adapted to force a stream of air through the casing, a motor for operating said propeller fan, and a plurality of vanes arranged in the casing adjacent the inlet side of the propeller fan, said vanes being adjustable about an axis perpendicular to the fan shaft to impart a rotational motion of selected magnitude to the air as it is directed toward the fan and to simultaneously increase resistance of the air flow therepast whereby the motor power required to drive the fan, within defined air delivery limits, is proportional to the volume of air forced through the casing.

17. The combination with a casing of a constant speed propeller fan arranged in the casing and means for regulating the volume of air delivered by the fan, said volume regulating means adapted to be positioned within the casing about an axis perpendicular to the fan shaft relatively to the fan to impart a rotational motion of selected magnitude to the air directed toward the fan and to simultaneously increase resistance of the air flow therepast whereby the power required to operate the fan, within defined air delivery limits, decreases with the volume of air delivered by the fan as it is selectively decreased.

18. The combination set forth in claim 17 and including means for limiting the position of the volume regulating means.

19. In combination, a casing, a constant speed propeller fan arranged in the casing and adapted to force air therethrough, a plurality of vanes swingably arranged in the casing adjacent the inlet side of the said propeller fan, a sleeve rotatably arranged on the casing and provided with a plurality of slots and an arm secured to the guide vanes and engaging the slots, whereby the guide vanes are swung in the casing about an axis perpendicular to the shaft upon rotation of the sleeve on the casing, to impart a rotational motion to the air directed toward the fan and to simultaneously increase resistance of the air flow therepast.

20. In a multi-stage fan, a casing, a plurality of propeller fans arranged in the casing, means for operating the fans, air volume regulating means comprising a plurality of guide vanes rotatably secured within the casing on the inlet side of the following stage fans and gear means for rotating the guide vanes into selected positions whereby air at predetermined volumes corresponding to the position of the vanes is delivered by the fans.

21. A multi-stage fan comprising a casing, a plurality of propeller fans arranged in the casing, a motor operatively connected to the fans and adapted to rotate them in the same direction and means for regulating the volume and direction of the air delivered by the fans including guide vanes adjustably mounted within the casing on the inlet side of the following stage fan and adapted to be adjusted to regulate the volume and direction of the air in the casing whereby the motor horsepower required to drive the fans decreases as the volume of air delivered by the fans is decreased by the selective adjustment of the said guide vanes.

22. The combination set forth in claim 21 and including means mounted on the exterior of the casing and connected with the guide vanes whereby the position of the said guide vanes may be simultaneously adjusted.

ALFRED E. SEELIG.